Figures 1, 2:
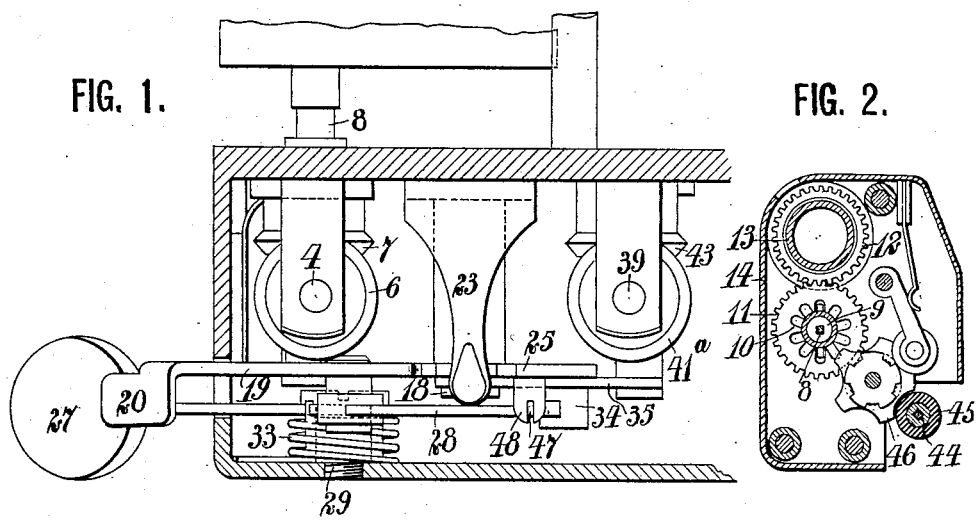

G. O. DEGENER.
COMPUTING MACHINE.
APPLICATION FILED JULY 1, 1911.

1,176,350.

Patented Mar. 21, 1916.

WITNESSES:
F. D. Swart.
J. A. Brophy

INVENTOR:
Gustave O. Degener
BY
D. C. Stickney
ATTORNEY

THE COLUMBIA PLANOGRAPH CO., WASHINGTON, D. C.

UNITED STATES PATENT OFFICE.

GUSTAVE O. DEGENER, OF NEW YORK, N. Y., ASSIGNOR TO UNDERWOOD COMPUTING MACHINE COMPANY, OF NEW YORK, N. Y., A CORPORATION OF NEW YORK.

COMPUTING-MACHINE.

1,176,350.      Specification of Letters Patent.      Patented Mar. 21, 1916.

Application filed July 1, 1911. Serial No. 636,427.

*To all whom it may concern:*

Be it known that I, GUSTAVE O. DEGENER, a citizen of the United States, residing in New York city, in the county of New York and State of New York, have invented certain new and useful Improvements in Computing-Machines, of which the following is a specification.

This invention relates to computing machines of the class described in United States application No. 485,046, filed March 22, 1909, and in my Patents No. 990,238, dated April 25, 1911, and No. 1,020,082, dated March 12, 1912, in which a master wheel is arranged to coöperate with a system of computing wheels, and in which a shift lever or key is provided for reversing the direction of rotation of the master wheel, to perform addition or subtraction as required; such mechanism including means for holding the shift-lever in a midway position for silencing the master wheel when required. Said lever or key is shiftable to any one of three positions, and the object of my invention is to provide means for simplifying the operation of silencing the master wheel, or of bringing the shift key to the midway position, with a view to simplifying and facilitating the manipulation of the machine.

In carrying out this invention, I provide an additional key, which in normal position is idle, but which may be depressed at any time with the effect of silencing the master wheel, regardless of whether the machine was previously adjusted for addition or not, that is, regardless of the previous position of said shift key.

The shift lever is connected to a clutch which is splined to a drive shaft. This clutch can be moved along said shaft to connect with either of two pinions which are loose on the shaft, and which mesh with a third pinion that is connected to the master wheel of the computing mechanism. According to this invention, a special key is provided, having two cams, either of which may engage a wrist which is provided upon the shift lever, to bring both said wrist and said lever to central position, at which time the clutch is in its middle or silenced position, or is disconnected from both said loose pinions on said drive shaft. This special key is movable in only one direction from normal position, so that the operator needs only to depress the key, in order to silence the computing mechanism.

Another feature of the invention is the allowance of a certain amount of play or lost motion in the parts of the shifting lever, as it not only shifts the clutch for connecting up the master wheel, but also shifts the clutch for connecting up the tens-carrying drive. That is to say, the shifting lever is made composite, with one part shifting the master wheel clutch and the other part shifting the tens-carrying clutch, with a lost motion between the two parts of the lever taken up by a spring, so as to allow the teeth of the clutches to settle independently with the corresponding clutch teeth on the loose pinions. This is more or less necessary as the drive shaft for the master wheel and the drive shaft for the tens-carrying may not be rotating exactly in synchronism, and the teeth of one pair of clutching elements may not settle in mesh at exactly the same time as the teeth of the other pair of clutching elements.

Other objects and advantages will hereinafter appear.

Figures 3, 4:
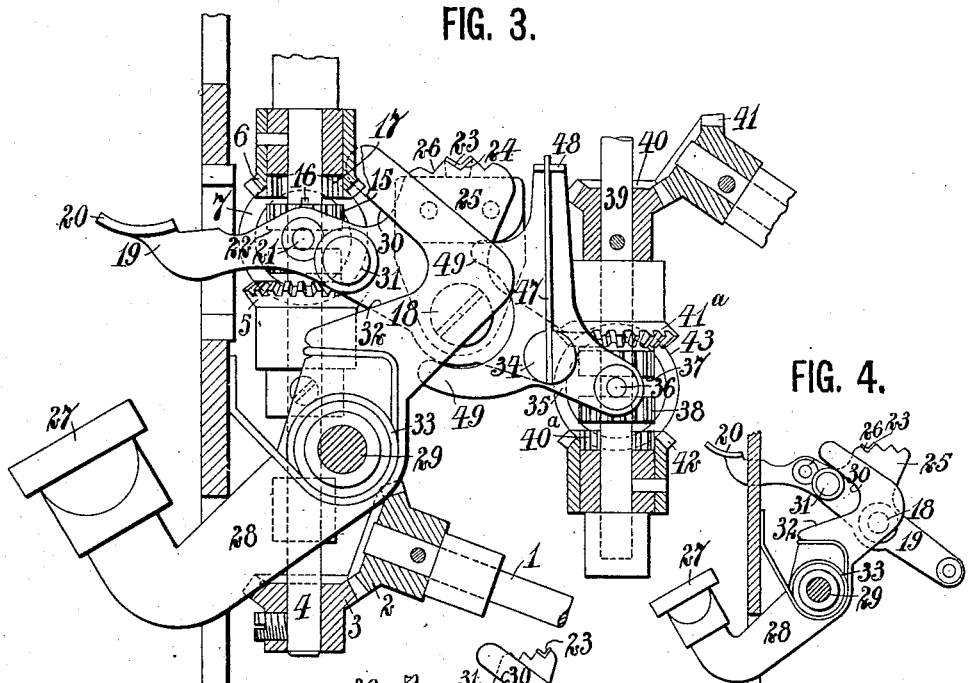
Figure 5:
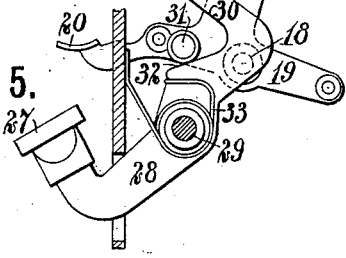

In the accompanying drawings, Figure 1 is a part sectional plan of the present improvements applied to an Underwood combined typewriting and computing machine of the kind set forth in said application. Fig. 2 is a sectional side elevation of the master wheel and trains of computing gears. Fig. 3 is a side elevation of the shift mechanism, showing the parts in normal positions, the primary shift lever being in midway or silenced position. Fig. 4 is a view similar to Fig. 3, but showing the parts shifted to position for subtraction. Fig. 5 is a view similar to Fig. 4, but showing the parts shifted to position for addition.

By means of keys, not shown, a shaft 1 is intermittently rotated various aliquot portions of a revolution. Upon this shaft is a pinion 2, meshing with pinion 3 upon a vertical drive shaft 4. Upon the latter are loosely mounted pinions 5 and 6, both running in mesh with a bevel pinion 7 upon a shaft 8, which carries a master wheel 9, meshing with internal gears 10 upon computing wheels 11, the latter meshing with gears 12 upon dial wheels 13 contained in a casing 14. Upon said drive shaft 4, between said pinions 5 and 6, is a double clutch member 15, splined to said drive shaft at 16, and adapted to mesh with either of opposite internal clutch members on said pinions, one of which is seen at 17. The member 15 is also shiftable to a position where it is out of engagement with both clutches 17, as at Fig. 3.

Pivoted upon the framework at 18 is a shift lever 19, carrying at its forward end a finger piece or key 20. A wrist 21 on said lever, forward of its pivot, engages an annular groove 22 formed between the ends of the double clutch 15, and is capable of lifting 15 into mesh with the pinion 6 or depressing it into mesh with the pinion 5. A spring detent 23 engages a notch 24 in arm 25 on said lever, to hold the same in midway or silenced position (Fig. 3).

The key 20 may be lifted from the Fig. 3 position to the position at Fig. 4, where it will be held by the spring detent 23 engaging a notch 26 in arm 25. The clutch 15 is now in mesh with the clutch 17 in the upper pinion 6, so that the pinion 7 and master wheel 9 will be rotated at the actuation of the numeral keys (not shown) in a direction to perform subtraction. Upon depressing the finger-piece 20 from Fig. 3 position or from Fig. 4 position to the position at Fig. 5, the lower member of the clutch 15 is brought into mesh with the clutch provided on pinion 5, so that the machine will add.

By depressing a key 27, a lever 28 is swung around its pivot 29, and a V-cam 30, 32 thereon engages a wrist 31 on said lever 19 and either depresses (Fig. 4) or elevates (Fig. 5) the same, bringing the key either down or up to the Fig. 3 position, and disengaging the clutch member 15 from either clutch 17, so that the machine can neither add nor subtract. A spring 33 returns the lever 28 to normal position. Thus whether the machine is set for adding or for subtracting, the special key 27, which is movable in only one direction from normal position, may be depressed at any time to silence the master wheel. Said lever 19 is preferably composite and made in two parts pivoted together at 34, one part being designated as 35 and having a wrist 36 to engage a groove 37 in a double clutch 38 splined on a second drive shaft 39, the latter having a pinion 40 in mesh with a pinion 41 by which it is rotated, such rotation being in some machines uninterrupted. The clutch member 38 may have pointed teeth to engage with clutches 40ª in upper and lower pinions 41ª and 42, loose on shaft 39 and both in mesh with a bevel pinion 43 on a shaft 44, which carries a soft rubber roll 45 normally revolving idly but adapted to engage any of a series of teeth 46 formed upon an assisting pinion which forms part of the tens-carrying mechanism of the computing wheels; this tens-carrying mechanism being set forth at length in said application.

A spring finger 47, extending from the pivot pin 34, engages a notch in a lip 48 formed upon the lever arm 35; 34 being fixed to 19, so that the arm 35 tends to move with 19, but may yield relatively thereto, to permit key 27 to operate, or to permit the key 20 to descend or rise to its full extent before the teeth in clutch 38 mesh fully with the teeth in the upper or lower pinion 41ª, 42. The arm 35 is provided with forks 49, one on each side of the pivot screw head 18, to engage the latter, to prevent undue turning of the joint 34.

The spring finger 47 holds the members 19 and 35 in normal relation, but permits relative vibration thereof in either direction, so that manipulation of either 20 or 27 may be completed, even if the tips of the teeth in clutch 38 at first collide with the tips of the teeth in either upper or lower clutch member 40ª.

Variations may be resorted to within the scope of the invention, and portions of the improvements may be used without others.

Having thus described my invention, I claim:

1. The combination with a computing mechanism including devices shiftable to adjust the machine for performing either addition or subtraction, and also shiftable to silence the computing mechanism, of a finger piece movable in only one direction from normal position, and means connected to said finger piece for shifting said devices from either the addition or subtraction adjustment to the silencing adjustment.

2. The combination with a computing mechanism including devices shiftable to three positions to adjust the machine for performing either addition or subtraction, and also shiftable to silence the computing mechanism, of a finger piece movable in opposite directions from normal position to shift said devices to either of the remaining two positions, and a special key movable in only one direction from normal position, and also having means to shift said devices to silenced position from either of the other two positions.

3. In a computing mechanism, the combination of a drive shaft, a master wheel, a clutch member, a lever connected to said clutch member to move it along said shaft to permit the latter to turn the master wheel either forwardly or backwardly, and also to a midway position to disconnect said drive shaft from said master wheel, a key movable in one direction from normal position, and means to enable said key to move said lever to midway disconnecting position from either of its extreme positions.

4. In a computing mechanism, the combination of a drive shaft, a master wheel, a clutch member, a lever connected to said clutch member to move it along said shaft to permit the latter to turn the master wheel either forwardly or backwardly, and also to a midway position to disconnect said drive shaft from said master wheel, a key movable in one direction from normal position, a V-cam connected to said key, and a wrist upon said lever and engageable by said V-cam, to move the lever to midway position from either of its extreme positions.

5. In a computing mechanism, the combination with a drive shaft, of a master wheel, a clutch member, a lever connected to said clutch member to move it along said shaft to permit the latter to turn the master wheel either forwardly or backwardly, and also to a midway position to disconnect said drive shaft from said master wheel, a key movable in one direction from normal position, a V-cam connected to said key, a wrist upon said lever engageable by said V-cam, to move said lever to midway position from either of its extreme positions, and a spring for returning said key to a normal position such that said V-cam will be free and clear of said wrist.

6. The combination of a computing mechanism, capable of existing under a plurality of states, as adding, subtracting and being silent, devices shiftable to adjust said mechanism for any of said states, and a finger piece arranged by a single action to shift said devices, so as to bring said computing mechanism to a certain state irrespective of its previous state.

7. The combination of a computing mechanism, capable of existing under a plurality of states, as adding, subtracting and being silent, devices shiftable to adjust said mechanism for any of said states, a finger piece arranged by a single action to shift said devices, so as to bring said computing mechanism to a certain state irrespective of its previous state, and means for holding said finger piece free and clear of said devices, so that said devices can operate independently of said finger piece.

8. The combination with a computing mechanism, of a master wheel drive for said computing mechanism, a tens-carrying drive for said computing mechanism, a clutch for said master wheel drive, a clutch for said tens-carrying drive, said clutches being each capable of occupying three positions corresponding to addition, subtraction, and silencing of the computing mechanism, and a controlling member acting by the same stroke to bring both of said clutches into a neutral position from either their adding or their subtracting position.

9. The combination with a computing mechanism, of means to drive said computing mechanism in opposite directions to add or subtract, a tens-carrying drive for said computing mechanism, a clutch for said first-named drive, a clutch for the tens-carrying drive, said clutches each capable of occupying three positions corresponding to addition, subtraction, and silencing of the computing mechanism, means for concomitantly shifting said clutches, said shifting means having a lost motion, and a controlling member effective on said shifting means and effective whenever operated to bring both clutches to neutral position irrespective of the position from which they are moved.

10. In a computing machine of the character described, having a shaft to be driven in either direction through different predetermined fractional portions of a revolution, a shaft having an undetermined movement of rotation in either direction, and means comprising shiftable clutch mechanism for driving said shafts independently of each other; the combination of a clutch-shifting lever, and a yielding connection between said lever and the clutch mechanism of one of said shafts, to permit the clutches of said shafts to be moved independently of each other.

11. In a computing machine of the character described, having a computing shaft to be driven in either direction through different predetermined fractional portions of a revolution and normally stationary, a transfer shaft having an undetermined movement of rotation in either direction and rotatable while the first-named shaft is stationary, and means comprising shiftable clutch mechanism for driving said shafts independently of each other; the combination of a clutch-shifting lever, and a yielding connection between said lever and the clutch mechanism of the transfer shaft, to permit the clutch of the computing shaft to be immediately shifted and the clutch of the transfer shaft to be moved independently thereof.

12. In a computing machine of the character described, having a computing shaft to be driven in either direction through different predetermined fractional portions of a revolution, a transfer shaft having an undetermined movement of rotation in either direction, and means comprising shiftable clutch mechanism for driving said shafts independently of each other; the combination therewith, of a clutch-shifting lever comprising a pair of members each connected with the clutch mechanism of one of said shafts to shift both clutches simultaneously, said lever members having a yielding spring connection therebetween, to permit the clutch of the computing shaft to be shifted immediately and positively, and to enable the clutch of the transfer shaft to be shifted independently thereof.

13. In a computing machine, the combination with driving members adapted to cause said machine to add or subtract, of means interposed in said driving members to make said members effective to add or subtract, a lost motion device for concomitantly shifting said means to change the driving state of a plurality of parts of said driving members, and a single key depressible to cause said members to be ineffective to either add or subtract irrespective of their previous state.

GUSTAVE O. DEGENER.

Witnesses:
J. E. LUCAS,
J. E. DAVIDSON.

Copies of this patent may be obtained for five cents each, by addressing the "Commissioner of Patents, Washington, D. C."